(12) United States Patent
Ragan et al.

(10) Patent No.: US 7,740,682 B2
(45) Date of Patent: Jun. 22, 2010

(54) HIGH-DENSITY COMPOSITE MATERIAL CONTAINING TUNGSTEN POWDER

(76) Inventors: Randall C. Ragan, P.O. Box 951, Rancho Santa Fe, CA (US) 92067; Randall M. Ragan, P.O. Box 951, Rancho Santa Fe, CA (US) 92067; Richard Vaughn Culbertson, 12909 Lomas Verdes Dr., Poway, CA (US) 92064

( * ) Notice: Subject to any disclaimer, the term of this patent is extended or adjusted under 35 U.S.C. 154(b) by 281 days.

(21) Appl. No.: 11/309,243

(22) Filed: Jul. 19, 2006

(65) Prior Publication Data

US 2008/0041271 A1 Feb. 21, 2008

Related U.S. Application Data

(60) Provisional application No. 60/595,641, filed on Jul. 22, 2005.

(51) Int. Cl.
B22F 1/00 (2006.01)
C09C 1/62 (2006.01)
C04B 14/10 (2006.01)
C08K 3/08 (2006.01)

(52) U.S. Cl. ............... 75/248; 106/287.17; 106/287.18; 106/486; 106/487; 106/811; 524/780

(58) Field of Classification Search .............. 106/286.8, 106/486, 487, 811, 287.17, 287.18; 75/248; 524/780
See application file for complete search history.

(56) References Cited

U.S. PATENT DOCUMENTS

| | | | | |
|---|---|---|---|---|
| 2,976,194 | A * | 3/1961 | Commanday et al. | 148/668 |
| 3,164,872 | A * | 1/1965 | Greenewald, Jr. | 164/528 |
| 4,915,733 | A | 4/1990 | Schutz | |
| 5,127,332 | A | 7/1992 | Corzine | |
| 5,171,968 | A * | 12/1992 | Bates et al. | 219/146.22 |
| 5,399,187 | A | 3/1995 | Mravic | |
| 5,527,376 | A | 6/1996 | Amick | |
| 5,548,125 | A | 8/1996 | Sandbank | |
| 5,616,642 | A | 4/1997 | West | |
| 5,641,920 | A | 6/1997 | Hens et al. | |
| 5,665,808 | A | 9/1997 | Bilsbury | |
| 5,719,352 | A | 2/1998 | Griffin | |
| 5,760,331 | A | 6/1998 | Lowden | |
| 5,877,437 | A | 3/1999 | Oltrogge | |
| 6,048,379 | A | 4/2000 | Bray | |
| 6,194,484 | B1 * | 2/2001 | Hugo | 523/135 |
| 6,257,149 | B1 | 7/2001 | Cesaroni | |
| 6,517,774 | B1 | 2/2003 | Bray | |
| 6,530,328 | B2 | 3/2003 | Burczynski | |
| 6,629,485 | B2 | 10/2003 | Vaughn | |
| 6,740,260 | B2 | 5/2004 | McCord | |
| 6,749,802 | B2 | 6/2004 | Amick | |
| 6,767,870 | B2 * | 7/2004 | Lockett, Sr. | 508/105 |
| 6,841,791 | B2 | 1/2005 | DeMeo | |
| 6,916,354 | B2 | 7/2005 | Elliott | |
| 7,157,140 | B1 * | 1/2007 | Hoppe | 428/402 |
| 2003/0027005 | A1 | 2/2003 | Elliott | |
| 2003/0056620 | A1 | 3/2003 | Siddle | |
| 2003/0102463 | A1 | 6/2003 | Smith | |
| 2005/0211930 | A1 * | 9/2005 | DeMeo et al. | 250/516.1 |

FOREIGN PATENT DOCUMENTS

| | | | | |
|---|---|---|---|---|
| JP | 57-06388 | A | * | 4/1982 |
| JP | 59-217680 | A | * | 12/1984 |
| JP | 61-196299 | A | * | 8/1986 |
| JP | 2004-300235 | A | * | 10/2004 |
| JP | 2005-187572 | A | * | 7/2005 |

* cited by examiner

*Primary Examiner*—Anthony J Green
(74) *Attorney, Agent, or Firm*—Henderson Caverly Pum & Charney LLP; Kristen E. Caverly

(57) ABSTRACT

An improved composite material, and method of manufacture thereof, comprising varying amounts tungsten powder, or metal/alloy powder of similar density, and clay or silicone is disclosed. The improved composite material may be useful as a replacement for lead and lead-based composites where similar densities are required but the use of lead is undesirable. The disclosed composite material permits a large variety of tungsten powder particle sizes to be utilized and results in improved ductility over known tungsten powder composites.

2 Claims, No Drawings

HIGH-DENSITY COMPOSITE MATERIAL CONTAINING TUNGSTEN POWDER

CLAIM OF PRIORITY

Applicant claims priority to Jul. 22, 2005 based on U.S. provisional application 60/595,641, filed as of that date.

SUMMARY OF INVENTION

The present invention relates to a composition of tungsten powder and clay or silicone which can be molded into a variety of products, including for use as ammunition, radiation shielding, weights, and other product applications where lead or other high-density tungsten composites are used. The present invention allows for use of tungsten powder particles of widely varying sizes, without regard to uniformity or non-uniformity of size, and results in improved ductility over known compositions of tungsten powder intended for lead-replacement applications.

Definition List 1

| Term | Definition |
| --- | --- |
| Clay | Is intended to be extremely broad and includes any natural or synthetic aggregate of hydrous silicate particles generally less than 4 μm (micrometers) in diameter, including but not limited to ball clay, slip clay, kaolins, and bentonite. Other minerals and carbonaceous material may be present. Equivalents are intended to be included. |
| Ball Clay | Includes all clays referred to by persons skilled in the ceramic arts as "ball clay" and includes clays which are sedimentary in origin and typically contains the minerals kaolinite, mica and quartz. However, these minerals may be present in small quantities or not at all, and other minerals and carbonaceous material may be present. Equivalents are intended to be included. |
| Water Emulsion Resin | Includes any aqueous emulsion polymer which may be used to bind together the separate components of the described composite. The water emulsion resins described herein may be manufactured with or without plasticizers. The water emulsion resins described herein may or may not contain surfactants. Without limitation, examples of water emulsion resins include resins available from Air Products, Inc. under the tradenames AirFlex ™ and Flexbond ™, and from Rohm & Haas Company under the tradename Rhoplex ™. |
| Plasticizer | Includes any of various substances added to other materials to make or keep them soft and/or pliable. |

The present invention relates to the field of high-density metal powder composites, particularly composites intended to replace lead while delivering similar densities and less environmental contamination.

Known compositions containing tungsten powder include the compositions disclosed in:

U.S. Pat. No. 6,048,379;
U.S. Pat. No. 6,916,354;
U.S. Patent Application No. 2003/0056620;
U.S. Patent Application No. 2003/0027005;
U.S. Pat. No. 4,915,733;
U.S. Pat. No. 5,616,642;
U.S. Pat. No. 5,719,352;
U.S. Pat. No. 5,399,187;
U.S. Pat. No. 5,877,437;
U.S. Pat. No. 6,629,485;
U.S. Pat. No. 5,760,331;
U.S. Pat. No. 5,527,376; and
U.S. Pat. No. 6,257,149.

The invention is a cohesive and malleable combination of two primary components, with or without additional binders and/or additives. The primary components of the claimed invention are tungsten powder, or other powdered metal or alloy of similar density, and clay. Depending upon the clay selected, tungsten powder particle size, whether and what binders and additives are included, and the relative amounts of each component in the finished composite, the resulting composite may range in ductility from that of lead/antimony alloy to that of soft modeling clay. Silicone may be used in place of some or all of the clay.

In the invention, densities of the resulting composite may be varied to match the requirements of the intended use. By way of non-limiting example, for ammunition applications, densities have been achieved in the range of 9.3 g/cc to 13.6 g/cc, with densities in the range of approximately 10.2 g/cc to 11.4 g/cc being preferred for small arms ammunition, and within that range densities of approximately 10.27 g/cc, 10.98 g/cc, and 11.37 g/cc being most preferred.

Examples of the invention which can be used for ammunition application have proven that in densities 11 g/cc and lower, a mixture of a high-density material (reprocessed recycled tungsten being the current preferred choice) and a lower density, less expensive material (such as steel, copper, or bismuth), along with the clay and binder have yielded good results. This allows the clay content and binder to be varied to optimize stiffness and forming properties, and the mix of metals adjusted independently to vary density. While the clay is required to yield forming properties, beyond a few percent of this very low density additive requires use of tungsten only to attain densities over 8.5 g/cc or so.

In the invention, the size of tungsten powder particles are not limiting. For example, very fine particles, such as of approximately 2 microns or less, and very coarse particles, such as approximately ⅓ the diameter of the intended finished product, may be used. Particles of varying sizes or particles of uniform size also may be used, although a range of particle sizes is preferred for optimal compaction. While particle size within a very wide range is acceptable in the invention, the intended use of the invented composite may limit desired particle size. For example, if the end product to be made with the invented composite is a round of ammunition with a pointed tip at one end, it may be desirable to chose a particle size smaller than the intended tip such that the particle size does not inhibit forming of the invented composite into the desired shape. The preferred tungsten powder particle size is generally more than 40 microns and generally less than 500 microns, although this preference is in no way limiting and is primarily based on material availability rather than performance.

In the invention, it is not necessary to use pure tungsten. Pure, recycled and/or tungsten alloys may be used. Use of heavy compounds of tungsten or mixtures of material found in tungsten process scrap may be cost effective. However, if the intended use of the invented composite is as lead-replacement due to environmental concerns, care should be taken to avoid tungsten combined with other metals or additives which could themselves create an environmental hazard. For example, cobalt is a common additive in tungsten which can cause environmental contamination.

In the invention, the clay used should be highly plasticized. Clays which may be used in the invention include at least ball clay, slip clay, kaolins, and bentonite. Other clays with similar ductility may also be used in the invention. Clays of the bentonite montmorillonite class may be used in the invention without resin or other binder. While many clays will be effective in the invention, ball clays are preferred for their density and ductility. Ball clays are available from numerous sources, including WBB Minerals, Ltd. on the internet at the www website at wbbminerals.com; ECC International on the internet at the www website at ecci.co.uk; and Old Hickory Clay Company on the internet at www website at oldhickoryclay.com.

In an embodiment of the invention, the following components are mixed by hand or other known mixing technique:
tungsten powder of mixed particles size in the general range of 40 microns to 500 microns;
Old Hickory™ Kentucky ball clay;
vinyl acetate water emulsion resin such as Flexbond™ by Air Products; and
water.

The mixture is then rolled or otherwise mixed until homogenous. Different sized roll mixers may be used for this process, or other known methods of mixing high-density materials such as pressure extrusion. Compaction/densification of the composite can be achieved as desired by pressure mixing, such as with roll mixers. The preferred method of mixing and densification is set forth in U.S. Pat. No. 3,097,929 entitled "The roll compaction process for manufacture of substrates." Sintering is not necessary but could be utilized for mixing and/or densification.

After mixing and densification to achieve the desired density, the composite is dried by known means, such as in a forced air oven at 150° C., to evaporate excess water. Since the ductility of the clay is water-sensitive, final moisture content may be critical in some mixes and may be varied depending upon the intended use. For example, one may desire somewhat more water in composite intended for extrusion molding, such as when the composite is intended for ammunition, than in composite intended for use without further molding, such as when the composite is intended for use as fishing weight. The dried composite may be molded by means appropriate to its ductility. For example, by varying the amount of clay and binder relative to the tungsten powder and the amount of drying, one can achieve a composite that is as soft as to be moldable by hand. Similarly, a composite may be achieved which is only moldable with high pressure or heat. In an embodiment of the invention, the dried composite may be molded into a reformable slug of constant diameter of about 0.18 inches and length of about 0.5 inches. This slug could then be fed into a pre-formed copper can or casing and subsequently re-drawn as a unit into a bullet or other shape.

In an embodiment of the invention, the composite is granulated. Granulated particle sizes may vary, with particles in the range of 30 to 60 mesh being considered particularly useful for further reforming. In achieving granulation of 30 to 60 mesh, optimum thickness for the rolled, dried pre-granulated sheets of composite is in the range of 0.030-0.040 inches. The mixed or uniform size ganular composite may be formed into its final desired shape through known means, such as compaction.

In an embodiment of the invention, surfactant may be added to the emulsion binder/resin, such as with a surfactant protected vinyl acetate emulsion. Other binders/resins may also be used, such a polyvinyl alcohol protected emulsions, in other embodiments of the invention. In an embodiment of the invention, no binder/resin is used.

In another embodiment of the invention, one or more lower density metals, such as tin, steel, or bismuth, are mixed with the tungsten powder, clay and resin before further processing. Nanosteel™, or so called glass-steel, also may be utilized in the invention.

In an embodiment of the invention, tungsten is combined with a two-part silicone system using known roll compaction techniques to form sheets with densities in the range of 8 g/cc, with an operating temperature range of up to 250 deg C. The resulting composite may be used for radiation shielding. By varying the amount of tungsten used, non-destructive elastic elongation may be achieved of 100% plus. The amount of elongation desired and the amount of tungsten to be used will vary depending upon the desired level of radiation shielding to be provided and desired elasticity of the finished product. The silicon used may be Silbione LSR 4305 manufactured by Rhodia, which includes parts V50093A-40 and V50093B-40.

It is anticipated that encapsulated lead and/or lead silicate, bismuth, copper, steel, and/or iron may be used in the invention in place of all or some of the tungsten. Other powdered metals or alloys with densities similar to lead and/or tungsten may be utilized in the invention in place of all or some of the tungsten powder.

In an embodiment of the invention, the finished composite consists of approximately 50 parts tungsten powder, approximately 2-3 parts ball clay, and approximately 2-4 parts polyvinyl alcohol protected emulsion resin/binder. In such embodiment, a dibenzyl phthalate plasticizer, such as Monsanto-s-160 also is used. Other plasticizers, such as Union Carbide Ucon™, ethylene glycol, polyethylene glycol, and water, can also be used in this and other embodiments of the invention. Use of a resin/binder such as Flexbond™ by Air Products avoids the necessity of adding an additional plasticizer.

The finished composite may be used in an infinite number of ways, by itself or in combination with other materials. By way of non-limiting example, in an embodiment of the invention, such as where the composite is intended for use in the application of radiation shielding, the finished composite may be covered with plastic, rubber, fabric, metal or other material. By way of further non-limiting example, in an alternative embodiment, such as where the composite is intended for use in the application of ammunition, the finished composite may be placed within a housing, such as a copper jacket, which may be used to affect the performance of the ammunition.

While the compositions of this invention have been described by example and preferred embodiments, it will be apparent to those of skill in the art that variations may be applied to the composition, methods and in the steps or the sequence of steps of the method described herein without departing from the concept and claimed scope of the invention. Further, it will apparent that certain agents which are chemically and physiologically related may be substituted for the agents described herein while the same or similar results would be achieved. All such similar substitutes and modifications apparent to those of skill in the art are intended to be within the concept and claimed scope of the invention.

What is claimed is:

1. A composition of matter comprising,
   a. approximately fifty parts tungsten powder;
   b. approximately two to three parts ball clay; and
   c. approximately two to four parts emulsion resin.

2. The composition of claim 1, further comprising a dibenzyl phthalate plasticizer.

\* \* \* \* \*